Jan. 2, 1945.    R. K. JEFFREY    2,366,407
CONVEYER
Filed May 28, 1942    2 Sheets-Sheet 1
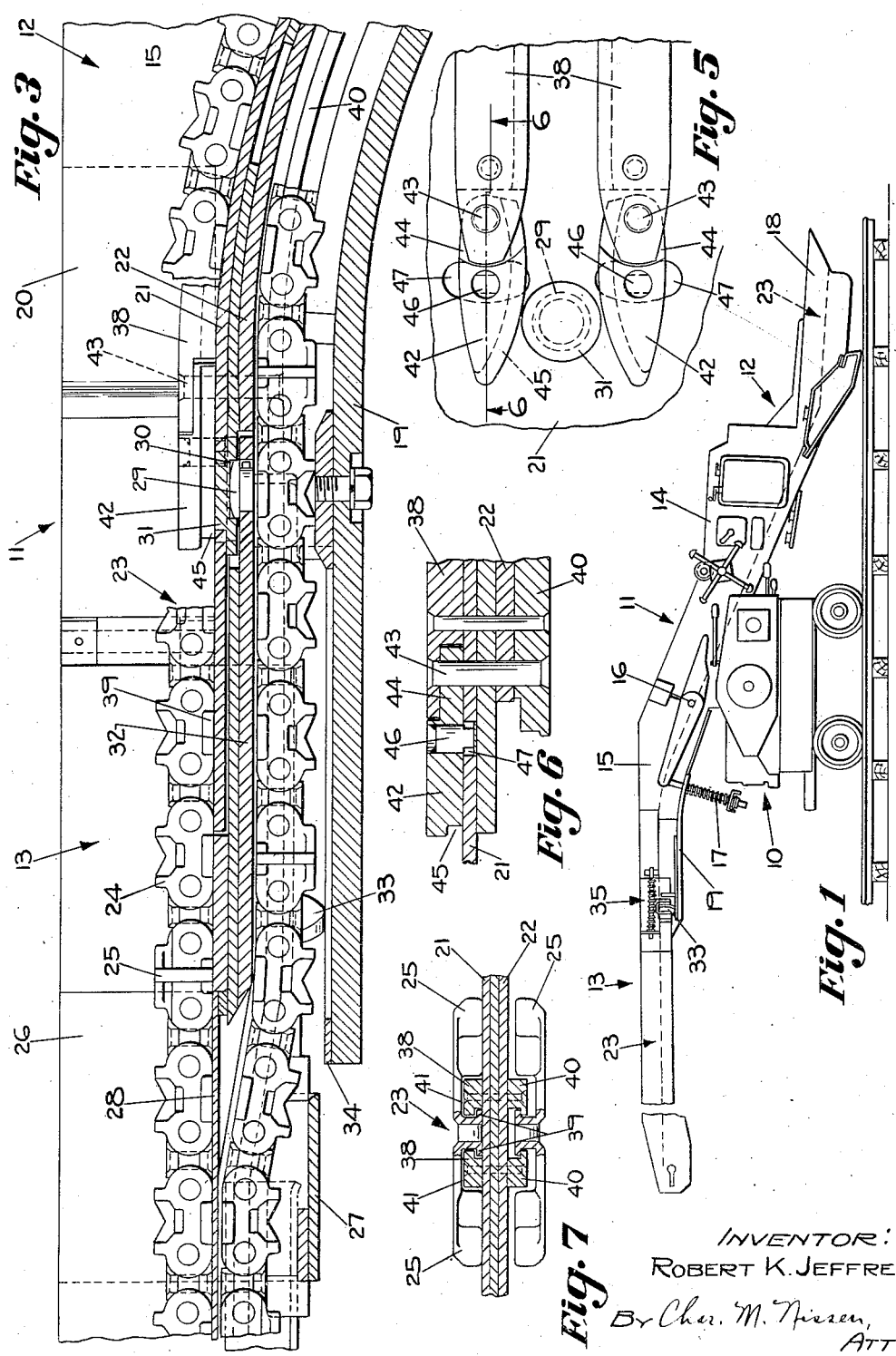
INVENTOR:
ROBERT K. JEFFREY,
By Chas. M. Niesen,
ATT'Y.

Jan. 2, 1945. R. K. JEFFREY 2,366,407
CONVEYER
Filed May 28, 1942 2 Sheets-Sheet 2
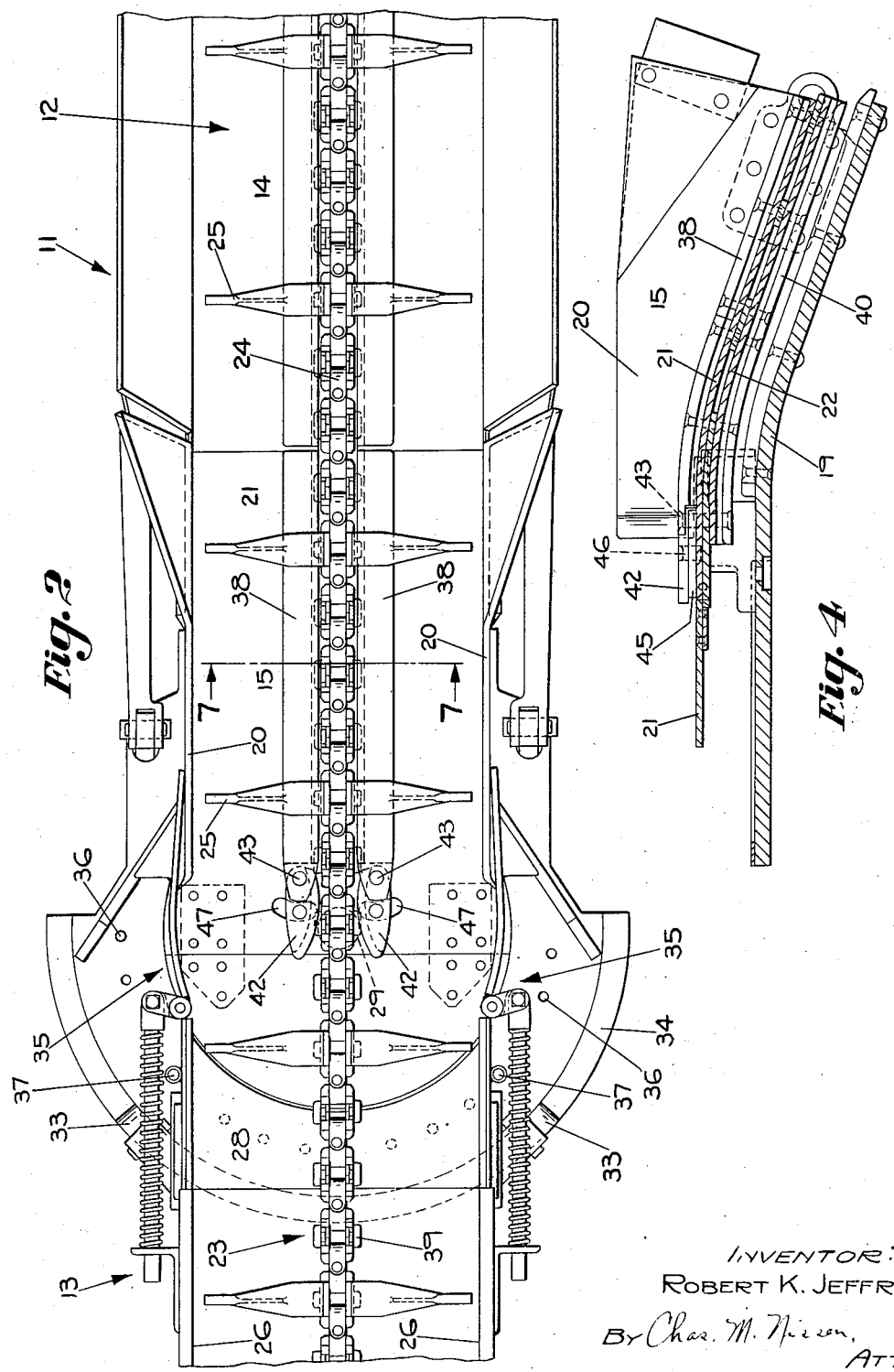
INVENTOR:
ROBERT K. JEFFREY,
By Chas. M. Nixon,
ATT'Y.

Patented Jan. 2, 1945

2,366,407

UNITED STATES PATENT OFFICE 2,366,407

CONVEYER

Robert K. Jeffrey, Columbus, Ohio, assignor to The Jeffrey Manufacturing Company, a corporation of Ohio Application May 28, 1942, Serial No. 444,810

11 Claims. (Cl. 198—109)

This invention relates to a conveyer and particularly to a conveyer including a trough having two sections connected for relative pivotal movement about an axis perpendicular to the trough bottom through which trough a chain and flight type of scraper conveyer extends to convey material along the trough sections.

An object of the invention is to provide improved means to guide the chain as it leaves the stationary guide mechanism associated with one of the trough sections and which is particularly effective when the trough sections are set at rather a sharp angle with respect to vertical alignment.

Another object of the invention is to provide improved guide means for a chain and flight type of scraper conveyer.

Other objects of the invention will appear hereinafter, the novel features and combinations being set forth in the appended claims.

In the accompanying drawings,

Fig. 1 is a side elevational view of a conveyer including the structure of my invention;

Fig. 2 is an enlarged plan of a portion of the conveyer of Fig. 1 showing particularly the features constituting the improvement of my conveyer over prior conveyers;

Fig. 3 is a longitudinal sectional view taken substantially along the center of the portion of the conveyer shown in Fig. 2;

Fig. 4 is an enlarged sectional view of a portion of the conveyer and chain guide means;

Fig. 5 is an enlarged plan view of extensions of the chain guide means which are an important element of my invention;

Fig. 6 is a sectional view taken on the line 6—6 of Fig. 5 looking in the direction of the arrows; and Fig. 7 is a transverse sectional view taken on the line 7—7 of Fig. 2 looking in the direction of the arrows showing only a part of the conveyer trough.

The conveyer of my invention constitutes an improvement on the conveyer as disclosed in the patent to Nils D. Levin, No. 2,047,589, dated July 14, 1936, but it is to be understood that the invention is by no means confined to this particular conveyer or any other particular conveyer.

In the accompanying drawings, particularly in Fig. 1, I have illustrated a discharge conveyer which in general follows the construction of the discharge conveyer disclosed in the above identified patent. The gathering conveyer disclosed in said patent, not forming a part of the invention herein disclosed and claimed, is not illustrated in the drawings. In the complete machine the gathering conveyer of said patent may or may not be incorporated therein. As also stated above, the features of novelty in this invention may be incorporated in quite different overall types of conveyers from that disclosed in the Levin patent above identified but in the interest of completeness I have illustrated the invention incorporating the complete conveyer disclosed in Fig. 1 as one illustrative embodiment of the invention.

Referring particularly to Fig. 1 of the accompanying drawings, the conveyer comprises a truck which, as illustrated, is adapted to travel on the rails of a mine track though it may be mounted on crawlers or pneumatic tires or it may even be stationary, in which last mentioned case it would be a supporting frame.

Supported upon the truck 10 is a continuous trough or frame work 11 comprising a receiving section 12 and a discharge section or boom 13. The receiving section 12 is formed into two parts comprising a lower part 14 and an upper part 15, which parts 14 and 15 are pivotally connected about a horizontal axis provided by a pivot pin 16, said two parts 14 and 15 being thus connected for relative movement about the axis of the pin 16 as controlled by spring means 17. This structure of the parts or sections 14 and 15 follows that disclosed in more detail in the above mentioned patent to Nils D. Levin. At its lower end the lower part 14 of the receiving section 12 is provided with a hopper 18 adapted to receive material, such as coal, from a gathering conveyer or the like, or said hopper 18 may be filled by hand shoveling.

As seen by reference to Figs. 2, 3 and 4 of the drawings, the upper part 15 of the receiving section 12 includes a main bottom or frame member 19 from the sides of which are upwardly extending side walls 20, the upper portions of which are flared outwardly at the rear end of said upper part 15 and cooperate with smaller trough forming side walls of the lower part 14 as clearly illustrated in Fig. 2 of the drawings. Positioned above the main frame member 19 and forming the active or working bottom of the trough of upper part 15 on receiving section 12 is a bottom plate 21 which extends continuously between and is attached to said side walls 20. As best seen by reference to Fig. 4 of the drawings, the bottom plate 21 is reinforced by cross strips and a spaced plate 22, said plate 22 acting with said cross strips to reinforce the bottom of the trough.

Extending longitudinally along the trough 11 from the receiving hopper 18 to the discharge end of the boom 13 is an endless scraper type conveyer mechanism 23 which is formed by a universal type endless chain 24 to which are attached laterally extending scraper flights 25 which are spaced along the chain 24 and, in operation, scrape material along the bottom of the trough 11. The endless chain 24 extends over guide sprockets at opposite ends, there being one at the discharge end of boom 13, preferably spring mounted to compensate for changing tension of chain 24 during swinging of boom 13, and one in the hopper 18, said chain being preferably driven by a drive sprocket mounted on the truck 10, there being an appropriate electric motor or the like to supply power to said drive sprocket.

The discharge section or boom 13 includes spaced side plates 26 which extend upwardly from the main frame or bottom member 27. Above the main frame member 27 and extending between the side plates 26 is a working bottom plate 28 of the trough portion formed by the discharge boom 13. This bottom plate 28 is preferably formed of a number of pieces and adjacent its forward end it is formed arcuate to correspond with a similar arcuate formation on the adjacent end of the bottom plate 21 of upper portion 15 of section 12, as clearly shown in Fig. 2 of the drawings.

The boom 13 is mounted for pivotal movement with respect to the section 12 and this pivotal connection is provided by virtue of a large pivot pin 29 having an enlarged cap which is received in a notch 30 formed in a thick plate 31 which is attached to and forms a part of the bottom plate 21 at the point of pivotal connection. The shank of the pivot pin 29 has a large diameter and extends into a circular hole wherein it is keyed, said hole being made in an under plate 32 which forms a forward extension of the boom 13 and which extends under the rearmost arcuate portion of the bottom plate 21 of upper part 15 of receiving section 12, all as clearly illustrated in Fig. 3 of the drawings.

Also to complete this pivotal connection between the boom 13 and receiving section 12 said boom 13 is provided at opposite sides with spaced rollers 33 mounted upon appropriate brackets connected to the sides of the boom 13 at the front end thereof or, in other words, at the end adjacent the pivotal connection thereof to section 12. These rollers 33 are adapted to ride upon an arcuate rail 34 carried upon the rearwardmost arcuate extension of the main frame member 19.

To provide continuity of the side walls of the trough for various positions of adjustment of the boom 13 with respect to the section 12 and about the perpendicular axis provided about the pin 29 spring pressed extensions 35 are provided which are attached to the side walls 26 and which overlap the side walls 20. This construction is disclosed more completely in the above identified patent to Nils D. Levin.

The curved rear end of the main frame 19 is provided with a plurality of holes 36 spaced along the arc of a circle the center of which is the axis of the pivot pin 29 and removable pin means 37 attached to the boom 13 is adapted to be received in one of said holes to maintain any selected angular position of adjustment of the boom 13 relative to the section 12.

It is desirable to guide the chain 24 in its travel through at least the rear portion of the section 12 and as illustrated, guide means are provided extending through both the lower part 14 and upper part 15 of said section 12. When the longitudinal axis of the boom 13 is set at a sharp angle with respect to the longitudinal axis of the receiving section 12 it is necessary to guide the chain 24 along a smooth curve as it leaves the guide means in order to prevent binding and catching of the chain links on said guide means and one of the principal features of my invention is to provide a novel construction to carry out this desired function which construction is operable regardless of the angle between the axis of the boom 13 and the receiving section 12 but which exercises its most important function as this angle increases from that of true alignment. In practice I contemplate rather large angles between the longitudinal axes of the boom 13 and the receiving section 12 which in extreme cases may approach 90 degrees on each side of the aligned condition.

Referring particularly to Figs. 2, 3, 4 and 7 of the drawings, it will be seen that mounted upon the plate 21 of the upper part 15 of receiving plate 12 is a pair of longitudinally extending spaced apart stationary guide strips or bars 38 which form guide means for the chain 24. The bars 38 guide the chain 24 substantially along the center of the trough 11 or, in other words, substantially along the center of the bottom plate 21. Similar guide means are provided in the lower part 14 as clearly seen by reference to Fig. 2 of the drawings. The guide bars 38 are provided on their lower inner surface with longitudinally extending grooves into which retaining gibs 39 of the links of the chain 24 extend. It is also seen by reference to Fig. 7 of the drawings that the plate 22 also carries similar guide bars 40 which guide and support the return run of the chain 24. Guide bars 38 and 40 are rigidly attached to the plates 21 and 22 as by countersunk rivets which extend through both plates 21 and 22 and one of each of the bars 38 and 40. It is also seen, particularly by reference to Figs. 7 of the drawings, that the flights 25 are provided with grooves or notches 41 so that there is a guiding surface on each side of each of the guide bars 38.

To provide for the aforementioned smooth travel of the chain 24 as it leaves the guides provided in the section 12 which terminate adjacent the pivotal axis of pin 29, I provide pivoted extension means which swing with the chain under the influence of the boom 13 as it swings from one position to another to which it may be adjusted. This structure is illustrated particularly in Figs. 2, 3, 4 and 5 of the drawings to which attention is now directed.

The structure is duplicated for each of the guide bars 38 as is evident by reference to Figs. 2 and 5 of the drawings. The end of each guide bar 38 adjacent the axis of pin 29 is curved on opposite sides thereof as clearly illustrated in Fig. 5 of the drawings and the nose thereof is also curved. Pivotally mounted adjacent the end of each bar 38 is a guide in the form of an extension 42 which is pivotally mounted by a pin 43 to swing about an upright axis. As illustrated in Fig. 6 of the drawings, the extension 42 has a tongue 44 which extends into a cut-out portion in the bottom portion of the end of the bar 38 through which tongue 44 the pivot pin 43 extends. The opposite sides of extension 42 are curved along convex curved surfaces leading to a smoothly curved point at the free end thereof. The inner curved surface of extension 42 is provided with a bottom groove 45 along which the gibs 39 of the chain 24 travel. The extension 42 is also provided with a limit pin 46 which extends into an arcuate slot 47 formed in the plate 21. As the chain 24 travels between the two extensions 42 the grooves 41 formed in the flights 25 will straddle said guide extensions 42 and if the boom 13 is adjusted at an angle with respect to the receiving section 12 it is evident that both of the guide extensions 42 will swing in the general direction of the boom 13 and guide the chain as it leaves said guide means on said upper part 15 of section 12. When the boom 13 is swung at a relatively sharp angle (it may be as high as 65 degrees or even higher) it is evident that the inner arcuate face of one of the guide extensions 42 and the outer arcuate face of the other guide extension 42 will cooperate to guide the conveyer mechanism 23 as it leaves said guide means and form a smooth curve for chain 24.

In the operation of the device, material to be conveyed will be delivered to the hopper 18. Conveyer mechanism 23 will be driven so as to convey material from the hopper 18 and discharge it over the rear end of the boom 13, the material being conveyed through the trough 11 and traveling along the bottom plates 21 and 28 successively under the scraper action of the flights 25 and chain 24. The chain 24 and flights 25 will be guided through the receiving section 12 by the guide means including the bars 38. If the boom 13 is swung about the pivot pin 29 the adjoining arcuate surfaces on the plates 21, 28 will provide substantial continuity of the bottom supporting surface in the trough 11. As the chain 24 leaves the guiding means, the guide extensions 42 will point in a direction along the axis of the boom 13 since they are free to swing about the pivot pins 43. Consequently the chain 24 will be guided along a smooth path regardless of the angular position of the boom 13 with respect to the receiving section 12. In the extreme positions each of the guide extensions 42 provides a substantial continuation of the arcuate end of the associated guide bar 38, the opposite sides of the associated end of each guide bar 38 being curved toward a blunt arcuate point.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I now desire to secure by Letters Patent of the United States is:

1. A conveyer comprising a trough formed of two sections, means pivotally connecting said sections for swinging movement about an axis perpendicular to the bottom of said trough, through an arc of at least 30 degrees to each side of alignment, conveyer scraper mechanism adapted to convey material through said trough sections including an endless chain extending substantially along the center line of said trough, flights extending laterally of said chain, stationary giudes for said chain extending on opposite sides thereof in one of said sections over which guides the flights extend, said flights having portions extending on the outsides of said guides, said chain being between said guides, and a guide extension at the end of each stationary guide where the chain leaves said stationary guides and substantially at the point of pivotal connection of said two sections, each guide extension being pivoted adjacent its associated stationary guide for pivotal movement independently of the other, said pivoted guide extensions being constructed to provide a smooth curved guide for said chain as it bends in traveling from one section to the other when they are angularly adjusted, said guide extensions being acted upon by said chain and flights to be maintained in proper chain guiding relation at all times.

2. A conveyer section comprising a trough having in its bottom a pair of spaced apart chain guides extending along the center of said trough, at least one of said guides having at its end an extension pivoted at one end to the end of a guide, said extension having a curved chain guiding inner surface.

3. A conveyer section comprising a trough having in its bottom a pair of spaced apart chain guides extending along the center of said trough, each of said guides having at its end an extension pivoted at one end to the end of a guide, said extension having a curved chain guiding inner surface.

4. A conveyer section comprising a trough having in its bottom a pair of spaced apart chain guides extending along the center of said trough, at least one of said guides having at its end an extension pivoted at one end adjacent the end of a guide, the pivotal axis of said extension being in alignment with said guide.

5. A conveyer section comprising a trough having in its bottom a pair of spaced apart chain guides extending along the center of said trough, each of said guides having at its end an extension pivoted at one end to the end of a guide.

6. A conveyer section comprising a trough having in its bottom a pair of spaced apart chain guides extending along the center of said trough, at least one of said guides having at its end an extension pivoted at one end to the end of a guide, and stop means for limiting the pivotal movement of said extension.

7. Conveyer mechanism including a material supporting surface, conveying means including a chain, flights on said chain, said chain and flights being adapted to travel and scrape material over said surface, a guide bar on said surface, said flights being constructed to straddle said bar and be guided thereby, an extension at the end of said bar, and means pivotally attaching one end of said extension adjacent said bar with the outer end free to swing as said chain swings and guide it along various paths, said extension having curved guiding surfaces on opposite sides.

8. Conveyer mechanism including a material supporting surface, conveying means including a chain, flights on said chain, said chain and flights being adapted to travel and scrape material over said surface, a guide bar on said surface, said conveying means being constructed to straddle said bar and be guided thereby, an extension at the end of said bar, and means pivotally attaching one end of said extension adjacent said bar with the outer end free to swing as said chain swings and guide it along various paths.

9. Conveyer mechanism including a material supporting surface, conveying means including a chain, flights on said chain, said chain and flights being adapted to travel and scrape material over said surface, a guide bar on said surface, said flights being constructed to straddle said bar and be guided thereby, an extension at the end of said bar, and means pivotally attaching one end of said extension adjacent said bar with the outer end free to swing as said chain swings and guide it along various paths, said extension having a curved guiding surface on one side thereof.

10. Conveyer mechanism including a material supporting surface, conveying means including a chain, flights on said chain, said chain and flights being adapted to travel and scrape material over said surface, a guide bar on said surface, said conveying means being constructed to straddle said bar and be guided thereby, an extension at the end of said bar, and means pivotally attaching one end of said extension adjacent said bar with the outer end free to swing as said chain swings and guide it along various paths, said extension having a curved guiding surface on the inside thereof.

11. Guide means for scraper conveyer mechanism including a supporting plate, a guide bar on said plate having curved guiding surfaces on opposite sides thereof, an extension guide pivoted adjacent said bar and on an axis within the lateral dimensions of said bar and also having curved guiding surfaces on opposite sides thereof, the guiding surfaces on one side of said bar and on one side of said extension guide forming a substantially continuous smooth curve when said extension guide is in one position and the guiding surfaces on the other side of said bar and said extension guide forming a substantially continuous smooth curve when said extension guide is in another position.

ROBERT K. JEFFREY.